June 2, 1936.  L. A. MARCH  2,043,052

INDUCTOR DYNAMO-ELECTRIC MACHINE

Filed Sept. 6, 1935  2 Sheets—Sheet 1

Inventor:
Laurel A. March,
by Harry E. Dunham
His Attorney.

June 2, 1936.                L. A. MARCH                2,043,052
                   INDUCTOR DYNAMO-ELECTRIC MACHINE
              Filed Sept. 6, 1935           2 Sheets-Sheet 2
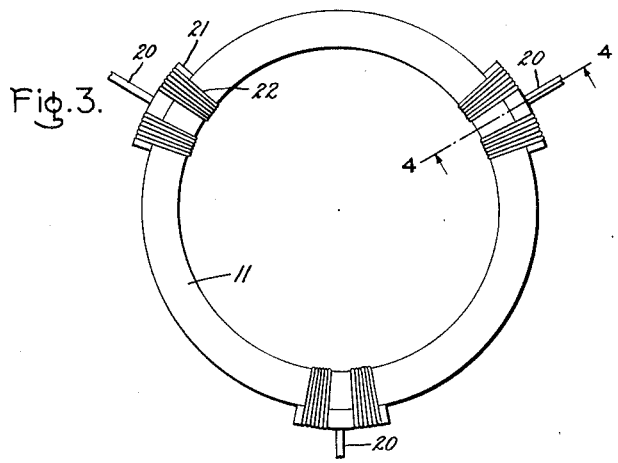
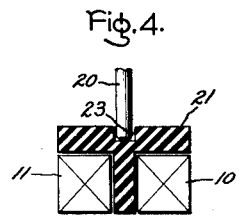
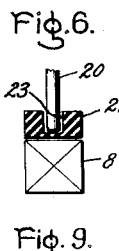
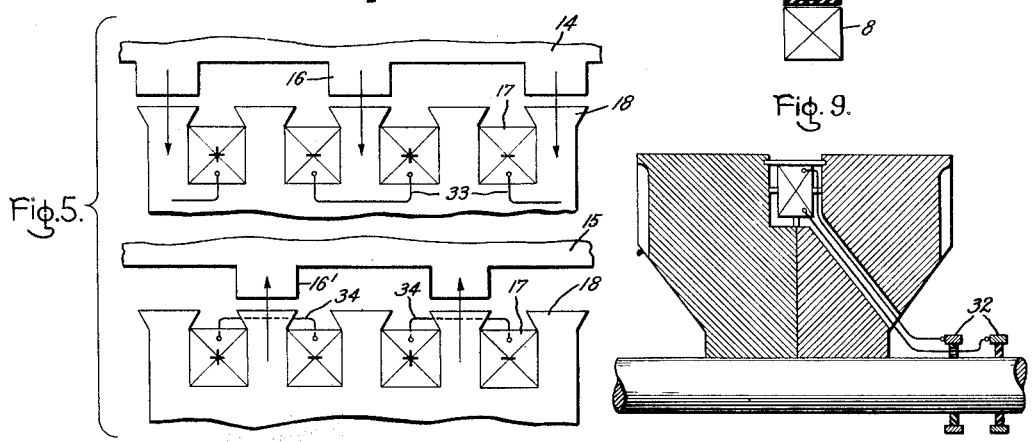
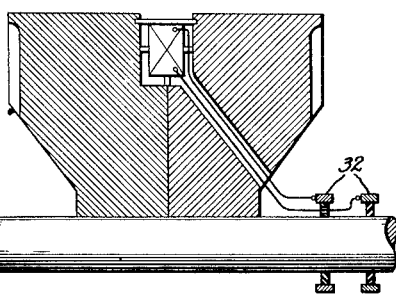
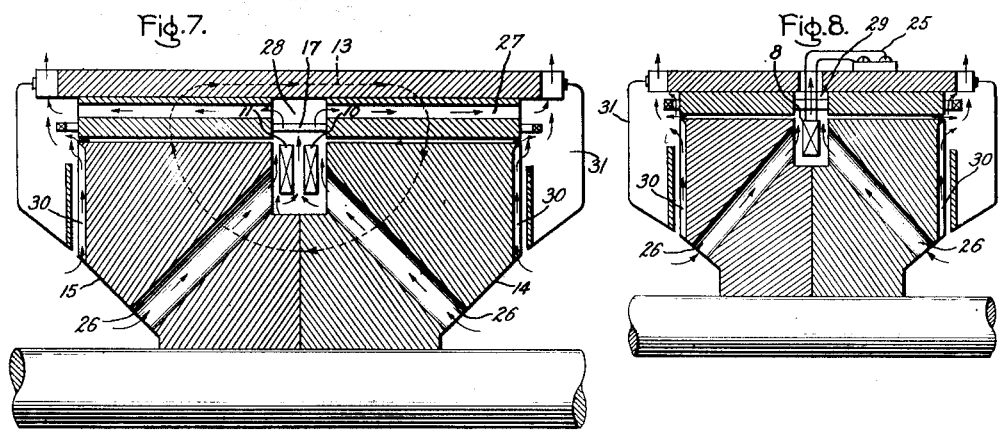
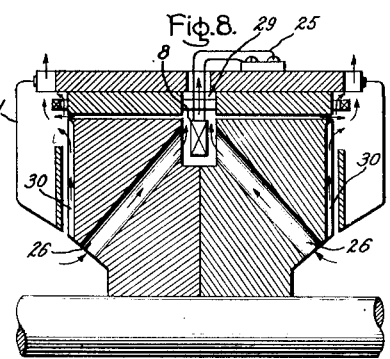
Inventor:
Laurel A. March,
by Harry E. Dunham
His Attorney.

Patented June 2, 1936

2,043,052

UNITED STATES PATENT OFFICE 2,043,052

INDUCTOR DYNAMO-ELECTRIC MACHINE

Laurel A. March, Schenectady, N. Y., assignor to General Electric Company, a corporation of New York Application September 6, 1935, Serial No. 39,420

1 Claim. (Cl. 171—252)

My invention relates to inductor type dynamo-electric machines and its object is to provide a design for such machines whereby the cost and size of the machine for a given capacity is materially reduced over previous designs and the efficiency and reliability increased. These improvements are brought about largely by the location of the field coil in the polar element of the machine instead of in the element which carries the alternating-current coils. This permits the latter element, preferably the stator, to be built with substantially the simplicity of an ordinary alternator stator both as regards the magnetic circuit assembly and the winding carried thereby. Although the field coil is then located in the body of the polar rotor, it is preferably stationary and supported in place in a novel manner from the stator to avoid the necessity of using slip rings.

Figure 1:
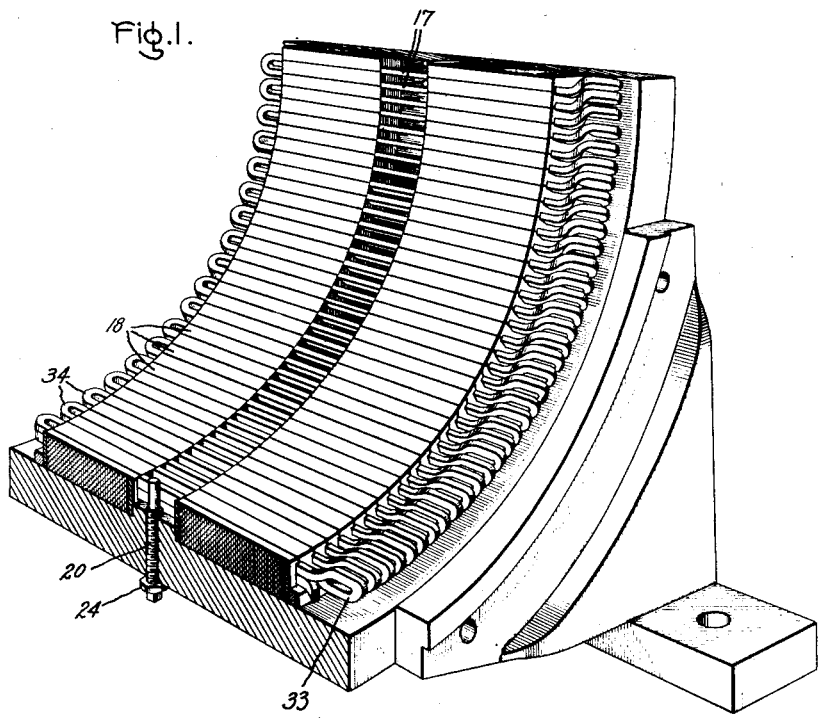
Figure 2:
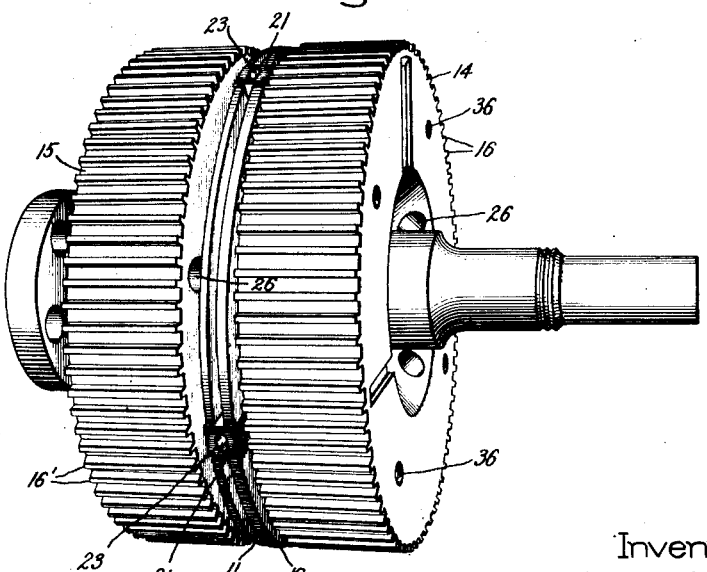

The new arrangement permits of providing very effective ventilation of the field coils as will be explained more in detail in connection with the accompanying drawings wherein Fig. 1 represents a quarter section of a stator element shown in perspective; Fig. 2 shows a perspective view of a polar rotor element; Figs. 3 and 4 illustrate the preferred manner of supporting the disc-shaped field winding when two coils are used, Fig. 4 being a sectional view on line 4—4 of Fig. 3; Fig. 5 is a diagrammatic representation of the relation of stator and rotor teeth to effect proper inductor generator action with straight generator slots and coils; Fig. 6 shows a sectional view of a support for a single field coil; Fig. 7 is a cross-sectional view through a portion of a machine showing the location of the field coils in the polar rotor and the method of ventilation; Fig. 8 is a corresponding view for a machine having a single field coil, and a slightly different arrangement of the ventilating ducts in the stator; and Fig. 9 represents a modified rotor which carries the field winding.

The use of a double-section field coil as in Fig. 7 instead of a single coil as in Fig. 8 is simply to facilitate ventilation and manufacture where it is desirable to use more copper than would be desirable to assemble in a single coil. In either case, the two sections 10 and 11 of Fig. 7 or the single field coil 8 of Fig. 8 produce a unidirectional flux through the magnetic sections of rotor and stator and the stator frame in series relation in the manner represented by dotted line 13, Fig. 7. The two halves 14 and 15 of the rotor are made of axially-abutting cylindrical steel sections and have polar teeth 16 and 16′ cut in their surfaces which extend opposite the two laminated stator sections. The teeth in one half 14 are staggered uniformly with respect to the teeth in the other half 15 and are spaced apart peripherally twice the distance of the spacing of the stator teeth 18. The teeth 18 and the intermediate slots in the two sections of the stator are not staggered with respect to each other but are aligned so that the coils 17 of the alternating-current stator winding extend straight across the two halves of the stator. It will thus be observed that, when the field coil is energized by direct current and the machine is in operation, positive flux pulsations will be produced in alternate stator teeth in one half of the stator on one side of given stator coil sections at the same instant that negative flux pulsations are produced through alternate stator teeth in the other half of the stator on the opposite side of the same coil sections. This theory of inductor generator action is diagrammatically illustrated in Fig. 5 where the upper group of rotor and stator teeth represent the relation and flux flow through the teeth at one end of the machine and the lower group of rotor and stator teeth represent the relation and flux flow through the teeth at the other end of the machine at the same instant with respect to the same stator coils. The end connections for the coils are also indicated; thus 33 represents the end connections at one end of the stator and 34 the end connections at the other end thereof.

The voltages thus generated in the two end halves of any straight coil section are in the same direction and the voltages generated in alternate straight coil sections are opposite as represented by the plus and minus marks on the coils in Fig. 5. These voltages reverse as the rotor moves a stator tooth pitch, thus producing alternating current. Thus, a single winding having straight-sided form wound coils may be used and multiple layer form wound coils may be used as in Fig. 1 or single layer form wound coils, as indicated in Figs. 7 and 8, may be used. It is necessary only to connect the different coils in series so that their voltages add to produce the voltage desired and to connect different similar coil groups in multiple to obtain the current magnitude desired as is well known in the art. The representations here shown are for single-phase machines.

The frequency of the current generated will, of course, be proportional to the speed of rotation and the number of poles in the inductor machine as is also well understood. The stator and rotor parts, pictured in Figs. 1 and 2, represent corresponding parts of a 1500 revolution per minute, 800 volt, 2000 cycle, single-phase inductor generator having eighty rotor teeth in each section of the rotor and one hundred and sixty stator slots.

Where the field winding, 10 and 11, Fig. 7, or 8, Fig. 8, is stationary, it is supported in the central cavity of the rotor from the stator by three or more bolts 20 spaced about the stator. The field winding is rigidly fastened at these points to insulating blocks 21 as by twine 22 and the blocks have recesses therein, as shown at 23 in Figs. 4 and 6, into which the bolts 20 fit like dowel pins. The bolts are tightened until the field winding is accurately located and firmly grasped by the pressure of the bolts which are then locked in place as by a lock nut 24, Fig. 1. By using hard drawn copper strip and a spiral wind for the field winding, it is rigid in construction and holds itself in the disc shape represented under the compression of the spaced holding bolts about its periphery with sufficient clearance from the rotor to allow of free rotation thereof allowing for end play, etc. Also the field coil may be made of ordinary field wire and the coil impregnated with a compound which when baked makes the coil rigid. The field terminal leads, properly insulated, are then passed between adjacent sections of the stator coils at the central non-laminated section and brought out through one of the stator ventilating ducts or through an opening made therefor in the manner represented at 25 in Fig. 8.

Very effective ventilation of the internally located field winding is provided as represented in Figs. 7 and 8. The two sections of the rotor are provided with diagonal ventilating ducts 26 leading from points at the outside of the rotor near the shaft and opening into the bottom portion of the field coil cavity near the central peripheral portion of the rotor. The number and size of such ventilating ducts will depend upon the size, speed, and cooling requirements of the machine. In a machine, such as is represented in Fig. 1, three or four such ducts, equally spaced about the rotor in each half thereof, will usually be sufficient. Where the field coil is stationary, the ducts in the two halves of the rotor may be located opposite each other as represented in Figs. 7 and 8. When the rotor is up to speed, air is drawn in at the openings near the shaft and forced out through the space around and between the field winding sections at high velocity by centrifugal force. The field winding being stationary, all parts thereof are washed by the air and it then finds its way out, partially through the air gap but largely through ventilating ducts in the stator. In Fig. 7, ventilating ducts 27 are provided in the stator parallel to the shaft beneath the stator windings and communicating with a central opening 28 in the stator laminations facing the central rotor cavity. The air is thus forced out through and about the stator coils, effectively cooling the machine.

For a smaller machine, it may be sufficient to provide central radial air ducts 29 in the stator as represented in Fig. 8.

In addition, the end surfaces of the rotor may be provided with radial grooves 30 extending nearly to the periphery. These grooves may cooperate with stationary baffles 31 at the ends of the machine to force air outwardly across the end turns and surfaces of the stator.

While I prefer to use a stationary field winding as above explained, it is also possible to secure the field winding on the rotor so as to rotate therewith, in which case, field terminals will be brought out so as to be accessible through one of the rotor ventilating ducts to slip rings 32 on the shaft, and the ventilating ducts in the two halves of the rotor will preferably be staggered. This rotor construction is indicated in Fig. 9. The supporting structure for the field winding in the central cavity will be of skeleton construction to permit of proper ventilation.

The cylindrical shaped shell or frame of the stator which bridges and supports the two axially displaced sets of stator laminations is of magnetic material and is a part of the magnetic circuit of the unidirectional field flux. It may be made quite thin radially because it is at the outer circumference of the machine and, therefore, nevertheless, has a large total cross-sectional area sufficient to carry the field flux in an axial direction. The rotor magnetic material between the shaft and field coil being of smaller diameter is designed with sufficient radial depth, as shown, to carry the same field flux axially between the two halves of the cylindrical shaped rotor.

To facilitate the assembly of the rotor and field coil in the stator, it is desirable to provide four holes 36, Fig. 2, through the rotor core so positioned that dowel pins may be inserted therein to exactly center the field coil 11 after the two rotor halves are assembled on the shaft. After the field coil has been centered, the holding pins 20 in the stator are screwed in place and locked and the centering dowel pins are then removed from the holes 36. The holes 36 are also preferably threaded in order that pull bolts may be screwed therein in case it becomes desirable to pull a rotor half endwise on the shaft to repair the field coil or to disassemble the rotor for any other reason. The dowel pin holes 23 in the field coil support are preferably made oval in shape, as illustrated, to facilitate the insertion of the holding pins 20 therein in case these holes do not line up exactly with the holding pins 20 as they are screwed in place and I have also found it advantageous to paint these holes 23 with a white paint before assembly in order that they may be more readily seen through the holding pin openings in the stator in aligning the field coil during assembly.

In the inductor machine as thus designed, the stator is of greatly simplified construction as compared to previous designs of this class of machines. Instead of two sets of stator coils as is usual, only one set is here required. The size and cost of the machine for a given output is correspondingly reduced and the reliability and efficiency improved. The novel ventilating scheme lends itself readily to the novel construction of the machine and is very effective. The novel features, as above explained, may be used in the construction of machines other than inductor generators, for example, in low-speed synchronous motors.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

An inductor type dynamo-electric machine comprising stator and rotor members, the stator member comprising a cylindrical magnetic shell and two axially displaced cylindrical laminated sections supported in said shell, each section having an equal number of evenly spaced teeth and slots in its inner periphery, the slots and teeth in one section being axially aligned with the teeth and slots in the other section, an alternating-current winding composed of straight-sided form-wound coils extending through the aligned slots of said stator, said rotor comprising a cylindrically shaped magnetic structure having salient polar portions within and opposite to the laminated sections of said stator, the polar portions being separated from each other by a recess cut in the surface of the rotor about its periphery, each of said polar portions having salient poles uniformly spaced apart a distance corresponding to twice the spacing of the stator teeth and the poles in the two rotor sections being uniformly staggered with respect to each other, a disc-shaped stationary direct-current field winding within the recess of said rotor supported from said stator, said winding surrounding the rotor and producing a unidirectional axial flux therethrough, and a plurality of ventilating ducts in said rotor extending diagonally outward from the outside ends thereof near the axis of rotation to and communicating with said central recess for forcing air about said field winding by centrifugal force when the machine is in operation.

LAUREL A. MARCH.